United States Patent [19]

Masaki

[11] 4,050,428

[45] Sept. 27, 1977

[54] CARBURETOR INTAKE AIR FLOW MEASURING DEVICE

[75] Inventor: Kenji Masaki, Yokohama, Japan

[73] Assignee: Nissan Motor Co., Limited, Yokohama, Japan

[21] Appl. No.: 666,316

[22] Filed: Mar. 12, 1976

Related U.S. Application Data

[63] Continuation of Ser. No. 396,368, Sept. 12, 1973, abandoned.

[30] Foreign Application Priority Data

Sept. 13, 1972 Japan .................................. 47-91253

[51] Int. Cl.² .......................... F02B 3/00; F02B 33/00
[52] U.S. Cl. ........................ 123/119 EC; 123/32 EA; 73/95; 73/118; 261/23 A; 261/69 R

[58] Field of Search ............... 73/95, 205 D, 213, 118; 123/32 EA, 140 MC, 119 EC, 32 ED; 261/23 A, 39 A, 39 D, 69 R

[56] References Cited

U.S. PATENT DOCUMENTS

| 2,488,221 | 11/1949 | Moore | 261/69 |
|---|---|---|---|
| 3,524,344 | 8/1970 | Converse et al. | 73/118 |
| 3,691,824 | 9/1972 | Vanderbilt et al. | 73/118 |
| 3,817,099 | 6/1974 | Bubniak et al. | 123/32 EA |

Primary Examiner—Carroll B. Dority, Jr.
Assistant Examiner—Arnold B. Cox

[57] ABSTRACT

The differential pressure between a carburetor venturi and an upstream point, and ambient pressure and temperature are sensed. Analogous electric signals are fed into an electronic computing means which produces an output analogous to the air flow rate through the carburetor.

4 Claims, 3 Drawing Figures

CARBURETOR INTAKE AIR FLOW MEASURING DEVICE

This is a continuation, of application Ser. No. 396,368, filed Sept. 12, 1973 now abandoned.

The present invention generally relates to an internal combustion engine having a carburetor with a venturi, and more particularly to a carburetor intake air flow measuring device which continuously measures the differential pressure between the carburetor venturi and an upstream location and electronically computes the intake air flow rate.

Heretofore, it has been known that an electric signal proportional to the instantaneous intake air flow rate of an internal combustion engine may be very advantageously utilized as an important parameter in various electronic control devices such as an electronic exhaust gas purifying control system, an electronic air-fuel mixture supply control system, and an electronic engine torque measuring device, and may be required to analyze engine performance.

As is well known in the art, a venturi type flow meter can be used to measure the flow rate of a fluid through a pipe or duct. The mass flow rate, $Q_w$, may be expressed in terms of the Bernoulli and continuity equations and an empirical discharge coefficient $C_D$ as follows:

$$Q_w = C_D A_2 \left[ \frac{2\Gamma g (dp - \Gamma dh)}{1 - (A_2/A_1)^2} \right]^{\frac{1}{2}} \quad (I)$$

where $A_2$ is the venturi area, $A_1$ is the area of an upstream measuring point, $Y$ is the weight density of the fluid entering the meter, $g$ is the acceleration of gravity, $dP$ is the differential pressure between the venturi measuring point and the upstream measuring point, and $dh$ is the difference in height between the two measuring points. If the fluid is assumed to be air, the conditions at the upstream measuring point are substantially atmospheric, the ratio $A_1/A_2$ is between 1.3 and 1.5, and a ratio $A_1/A_3$ (where $A_3$ is the area of the pipe downstream of the venturi) is between 1.2 and 1.3, it has been found experimentally that the value of $Y$ can be approximated by $$\Gamma = \frac{CP_A}{T_A} \quad (II)$$

where $P_A$ is the ambient or barometric pressure, $T_A$ is the ambient temperature, and $C$ is a constant, the value of which is dependent on the system of units used.

From the above equations (I) and (II), it will be seen that it is possible to continuously measure the flow rate of intake air being taken into an internal combustion engine under all varying engine operating conditions by measuring the pressure difference between the venturi and an upstream portion of a conventional automotive carburetor. If the venturi flow meter principle is thus adapted to an automotive carburetor, it will be understood that the parameters $C_D$, $A_1$, $A_2$, $C$, $g$, and $dh$ in equations (I) and (II) are constant, and that the weight flow rate $Q_w$ may be expressed in terms of $dP$, $Y$, $P_A$ and $T_A$. Since $Y$ is a function of $P_A$ and $T_A$ as expressed in equation (II), it is clear that the value of $QW$ may be completely determined by measurement of the three parameters $dP$, $P_A$ and $T_A$.

Equations (I) and (II) may be employed within the scope of the invention. Also, although the weight flow rate $QW$ has been taken by way of example, the mass or volumetric flow rate may be utilized if desired through simple modification of equations (I) and (II).

A carburetor intake air flow measuring device according to the present invention is capable of continuously measuring the flow rate of air entering an engine through a carburetor having a venturi by measuring the pressure difference between the venturi and an upstream point. This differential pressure is converted to an analogous electric signal by a sensor which is fed into an electronic computing means, into which is also fed electric analog signals representing ambient pressure and temperature from other sensors. The electronic computing means continuously computes the flow rate of air through the carburetor using equations (I) and (II) or modifications thereof, and provides an electric or mechanical output representing the air flow rate.

It is, therefore, an object of the present invention to provide a device which is capable of measuring the instantaneous flow rate of intake air being taken into an internal combustion engine under all varying engine operating conditions by advantageously utilizing a conventional prior art carburetor having a venturi.

Another object of the present invention is to provide an intake air flow measuring device which is simple in construction and economical to manufacture on a commercial production basis.

Still another object of the present invention is to provide an intake air flow measuring device which is highly reliable in operation and can be easily utilized with a conventional carburetor having a venturi.

These and other objects and advantages of the present invention will become apparent from the following detailed description taken in conjunction with the accompanying drawings in which like reference numerals designate corresponding parts in all figures and in which.

Figure 1:
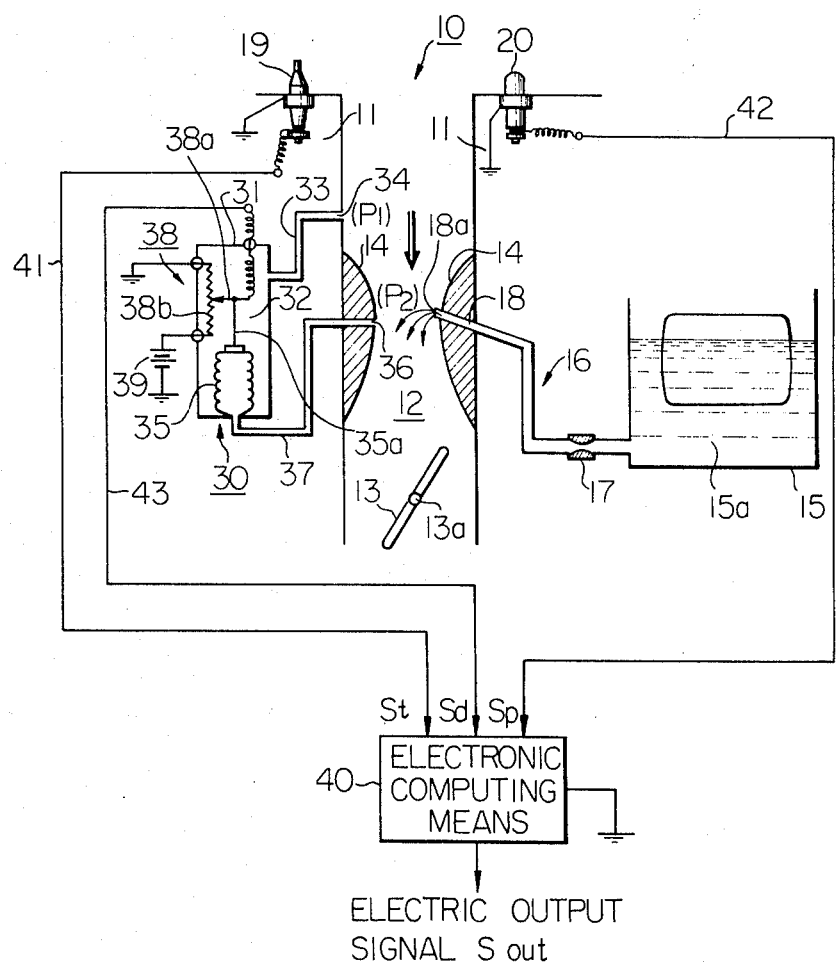
FIG. 1 is a schematic sectional view of a preferred embodiment of a carburetor intake air flow measuring device according to the present invention connected to a conventional carburetor having a venturi.

Referring now to the drawings and more particularly to FIG. 1, there is shown an embodiment of a carburetor intake air flow measuring device of the present invention connected to a single-barrel carburetor 10. The carburetor 10 comprises a carburetor body 11, an inner surface of which defines a carburetor induction passageway 12 communicating with an intake manifold of an internal combustion engine (not shown). The carburetor 10 is also provided with a throttle valve 13 which is mounted on a rotatable shaft 13a for rotation within the carburetor induction passageway 12, a venturi 14, and a float chamber 15 containing fuel 15a. The carburetor body 11 has formed therein a fuel supply passageway 16 for supplying the fuel 15a into the carburetor induction passageway 12 from the float chamber 15 through a fuel jet 17 and a nozzle 18 having an opening or port 18a which opens into the venturi 14.

The carburetor body 11 is further provided with an intake air temperature sensor 19 comprising, for example, a thermistor to sense the temperature of intake air being taken into the carburetor induction passageway 12 and produce an electric intake air temperature signal $St$, and an atmospheric pressure sensor 20 to sense the atmospheric pressure and produce an electric atmospheric pressure signal $Sp$. A differential pressure sensor 30 measures the difference in pressure between the venturi 14 and a point upstream of the venturi 14. The differential pressure sensor 30 comprises an air-tight casing 31 having formed therein a sealed chamber 32 which communicates through a passageway 33 with a port 34 upstream of the venturi 14 to receive an upstream pressure $P_1$. The air-tight casing 31 is provided in the sealed chamber 32 with a mechanical differential pressure sensor such as a bellows 35, the interior of which communicates with a port 36 through a passageway 37 to receive a venturi pressure $P_2$. Since one end (no numeral) of the bellows 35 is fixed to the interior of the casing 31, the differential pressure between the ports 34 and 36 may be expressed by the displacement of the other end (no numeral) of the bellows 35. The differential pressure $P_2 - P_1$ corresponds to the parameter $dP$ described above, and the bellows 35 serves to provide an analog mechanical output for the value of $dP$ ($dP = P_2 - P_1$). If desired, a diaphragm or other pressure sensitive element may replace the bellows 35. A rod 35a connects the other end of the bellows 35 to a slider 38a of a rheostat 38, a coil 38b of which is connected between ground and a power source such as a battery 39. The rheostat 38 produces an electric differential pressure signal Sd analogous to the displacement of the rod 35a and thus to the differential pressure $dP$. The rheostat 38 acts as mechanical to electric analog converter, and may be replaced by any element performing the same function such as a piezo-electric element. It will be understood that the parameters $Sp$, $St$ and $Sd$ correspond respectively, to the parameters $P_A$, $T_A$ and $dP$ of equations (I) and (II).

An electronic computing means 40 receives the electric atmospheric pressure, intake air temperature and differential pressure signals $Sp$, $St$ and $Sd$ through lines 41, 42 and 43 respectively. The electronic computing means 40 may be of any known type as long as it is capable of producing an electric output signal Sout analogous to the parameter $Qw$ of equation (I) from the inputs $Sp$, $St$ and $Sd$. The computing means 40 is designed so that the various constants of equations (I) and (II) are incorporated therein. The means 40 may also be adapted to utilize alternative or modified forms of equations (I) and (II) if desired, and/or compute the mass or volumetric flow rate rather than the weight flow rate. The means 40 produces the electric output signal Sout and may further be adapted to produce a corresponding mechanical output if desired. The output from the means 40 may be fed to an exhaust gas purifying system, a fuel mixture control system, a torque measuring device, etc. for use as a parameter thereof.

Figure 2:
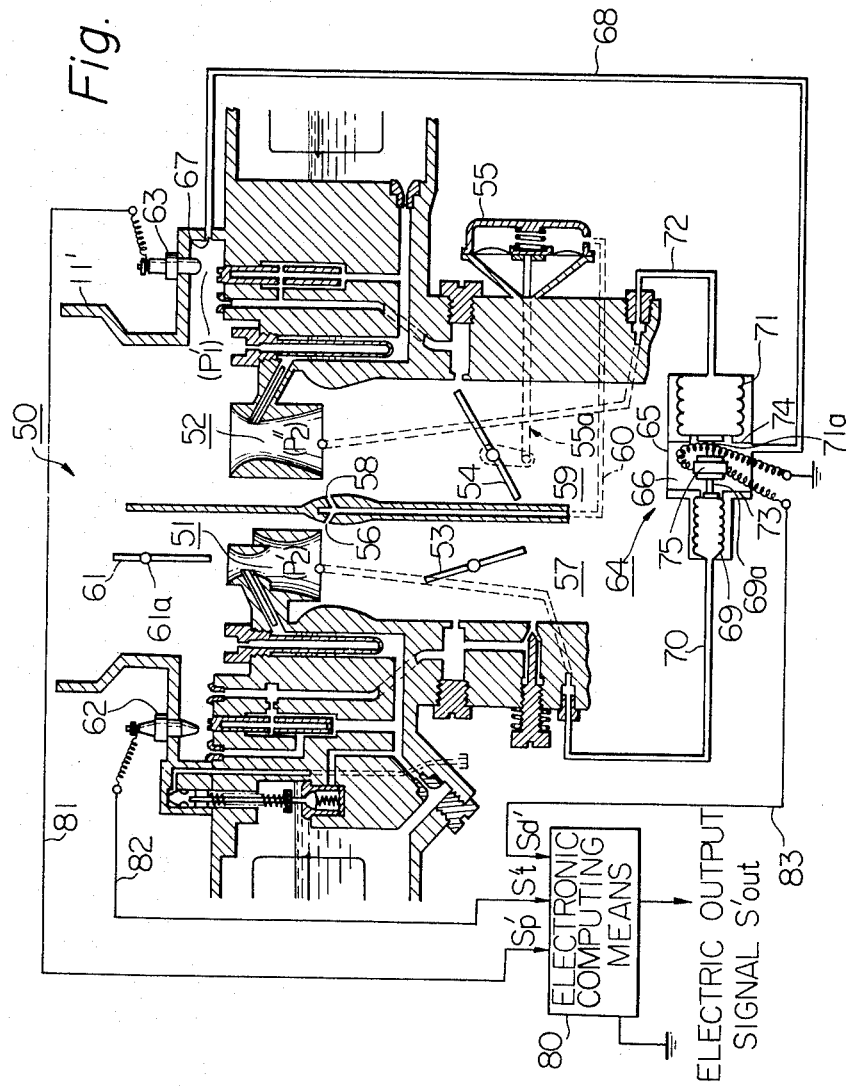
FIG. 2 is a schematic sectional view of another embodiment of a carburetor intake air flow measuring device according to the present invention.

FIG. 2 shows a second embodiment of a carburetor intake air flow measuring device of the present invention and a two-barrel carburetor 50 to which it is connected. The carburetor 50 includes a primary venturi 51, a secondary venturi 52, a primary throttle valve 53, a secondary throttle valve 54 and a diaphragm 55 which controls the operation of the secondary throttle valve 54 in dependence on the operation of the primary throttle valve 53 through a linkage member 55a. The carburetor 50 further includes a carburetor body 11' which has formed therein two openings or ports; a primary port 56 opening into a primary carburetor induction passageway 57, and a secondary port 58 opening into a secondary carburetor induction passageway 59. These ports 56 and 58 communicate with the diaphragm 55 through a passageway 60. A choke valve 61 is mounted on a rotatable shaft 61a for rotation within the primary carburetor induction passageway 57. The carburetor 50 is also provided with an intake air temperature sensor 62 and an atmospheric pressure sensor 63 which correspond to the sensors 19 and 20 shown in FIG. 1.

In this embodiment, a differential pressure sensor 64 senses the combined differential pressures in the primary and secondary induction passageways 57 and 59 and produces an electric differential pressure signal $Sd'$ analogous thereto. A casing 65 of the sensor 64 defines therein a vacuum chamber 66 which communicates through a passageway 68 with an upstream port 67 similar to the previous embodiment to receive an upstream pressure $P_1'$. Two bellows 69 and 71 are fixed at opposite ends thereof (no numeral) to the interior ends (no numeral) of the chamber 66. The bellows 69 communicates through a passageway 70 with the primary venturi 51 to receive a primary venturi pressure $P_2'$, and the bellows 71 communicates through a passageway 72 with the secondary venturi 52 to receive a secondary venturi pressure $P_2''$. The other (movable) ends of the bellows 69 and 71 are connected throug rods 69a and 71a respectively to a piezo-electric element 75. Stops 73 and 74 respectively limit the movement of the bellows 69 and 71. The element 75 may or may not be fixed to the casing 65 depending on the type used. The element 75 is adapted to produce the electric differential pressure signal $Sd'$ analogous to the quantity $[(P_2' + P_2'') - P_1'[$, or to the combined differential pressures in the induction passageways 57 and 59. A rheostat or other element providing the same function may replace the piezo-electric element 75 similar to the previous embodiment.

An electronic computing means 80 receives the electric atmospheric pressure, intake air temperature and differential pressure signals $Sp'$, $St'$ and $Sd$ 40 through lines 81, 82 and 83 respectively. The electronic computing means 80 operates essentially similar to the electronic computing means 40 shown in FIG. 1, and a specific explanation thereof can be omitted.

When, in operation, the primary throttle valve 53 is opened, the pressure $P_2'$ in the primary venturi 51 is transmitted to the primary bellows 69 through the passageway 70, so that the bellows 69 is contracted by the pressure $P_2'$ corresponding to the primary differential pressure. The piezo-electric element 75 then produces an electric signal respresenting the primary differential pressure. At this time, the secondary bellows 71 remains in its original position because of the provision of the stop 74.

When the primary throttle valve 53 opens slightly under partial engine load, a small volume of air flows through the primary venturi 51, and the pressure at the primary port 56 is insufficient to actuate the diaphragm 55, and thus the secondary throttle valve 54 remains closed. Accordingly, no air flows through the secondary venturi 52 so that the secondary bellows 71 still remains its original position.

On the other hand, when the primary throttle valve 53 is fully opened, a large volume of air flows through the primary venturi 51, and the pressure at the port 56 actuates the diaphragm 55 to open the secondary throttle valve 54. The pressure $P_2''$ at the secondary venturi 52 is then transmitted to the secondary bellows 71 to move it, so that the element 75 produces an electric output signal analogous to the combined differential pressures in the induction passageways 57 and 57. This signal, $Sd'$, is transmitted to the electronic computing means 80 under all engine operating conditions. The means 80 operates essentially similar to the means 40 of the previous embodiment.

Figure 3:
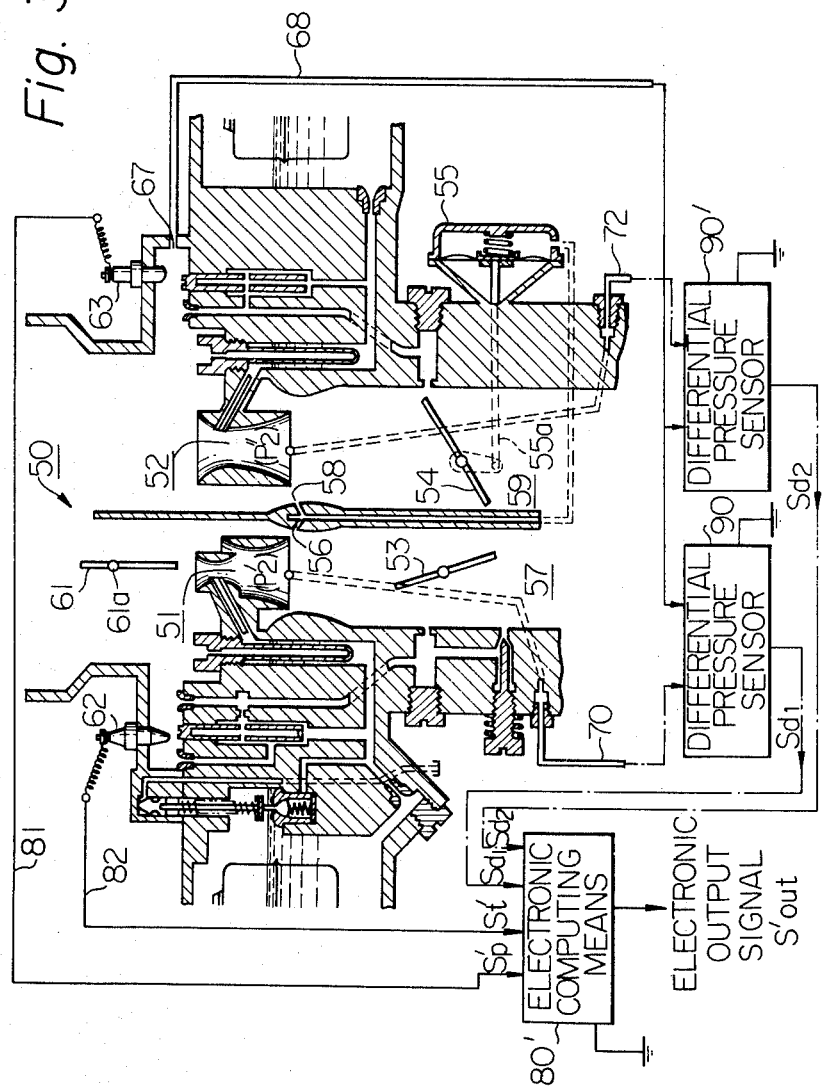
FIG. 3 is a schematic sectional view of a modified form of the carburetor intake air flow measuring devices shown in FIGS. 1 and 2.

FIG. 3 illustrates a modified form of a carburetor intake air flow measuring device of the present invention shown in FIGS. 1 and 2. In this modification, the measuring device is provided with two differential pressure sensors 90 and 90', such as the rheostat 38 shown in FIG. 1, which sense the primary differential pressure between the port 67 and the primary venturi 51 and the secondary differential pressure between the port 67 and the secondary venturi 51, respectively. The sensor 90 produces an electric primary differential pressure signal $Sd_1$, while the sensor 90' produces an electric secondary differential pressure signal $Sd_2$. The primary and secondary differential pressure signals $Sd_1$ and $Sd_2$ are fed to an electronic computing means 80'. The electronic computing means 80' is essentially similar to the electronic computing means 40 or 80 shown in FIGS. 1 and 2 so that a detailed explanation thereof can be omitted.

In addition, the other parts and elements in this modification are similar to the corresponding parts and elements used in the embodiment shown in FIG. 2.

The herein presented detailed descriptions of preferred embodiments of the present invention are for the purpose of explaining the principles thereof only, and are not to be considered as limiting or restricting the present invention, since many modifications may be made by exercise of skill in the art without departing from the scope of the present invention.

What is claimed is:

1. A carburetor intake air flow measuring device for electronically measuring an instantaneous flow rate of intake air introduced into an internal combustion engine under all varying engine operating conditions, which device comprises:
    a two-barrel carburetor having a primary venturi and a secondary venturi:
    first sensing means for sensing atmospheric pressure to produce an electric atmospheric pressure signal;
    second sensing means for sensing intake air temperature to produce an electric air temperature signal;
    third sensing means for sensing a primary differential pressure between said primary venturi and an upstream point and a secondary differential pressure between said secondary venturi and an upstream point to produce an electric differential pressure signal representing a difference between said primary and secondary differential pressures, said third sensing means having a primary mechanical differential pressure sensor responsive to said primary differential pressure to provide a primary analog mechanical output, a secondary mechanical differential pressure sensor responsive to said secondary differential pressure to provide a secondary analog mechanical output, and a mechanical-to-electric analog converter means to convert said primary and secondary mechanical analog output to the electric differential pressure signal, each of said primary and secondary mechanical pressure sensors comprising a respective diaphragm; and
    electronic computing means responsive to said electric atmospheric pressure, intake air temperature and differential pressure signals, received as separate signals directly from each sensing means, to produce an electric output signal representing the instantaneous flow rate of said intake air.

2. A carburetor according to claim 1, wherein said convertor means comprises piezo-electric means.

3. A two-barrel carburetor for an internal combustion engine comprising:
    a primary venturi;
    a secondary venturi; and
    a device for electronically measuring an instantaneous flow rate of intake air introduced into an internal combustion engine under varying engine operating conditions, said device comprising first sensing means for sensing atmospheric pressure to produce an electric atmospheric pressure signal, second sensing means for sensing intake air temperature to produce an electric intake air temperature signal, third sensing means for sensing a primary differential pressure between said primary venturi and an upstream point and a secondary differential pressure between said secondary venturi and an upstream point to produce an electric differential pressure signal representing a difference between said primary and secondary differential pressures, said third sensing means having a primary mechanical differential pressure sensor responsive to said primary differential pressure to provide a primary analog mechanical output, a secondary mechanical differential pressure sensor responsive to said secondary differential pressure to provide a secondary analog mechanical output, and a mechanical-to-electric analog converter means to convert said primary and secondary mechanical analog output to said electric differential pressure signal, each of said primary and secondary mechanical differential pressure sensors comprising a respective diaphragm; and
    electronic computing means responsive to said electric atmospheric pressure, air temperature and differential pressure signals, received as separate signals directly from each sensing means, to produce an electric output signal representing the instantaneous flow rate of said intake air.

4. A carburetor according to claim 3, wherein said converter means comprise piezo-electric means.

* * * * *